Jan. 22, 1963   G. I. SPADARO   3,075,069
PHOTOGRAPHY APPLIANCE
Filed Aug. 1, 1960   2 Sheets-Sheet 1
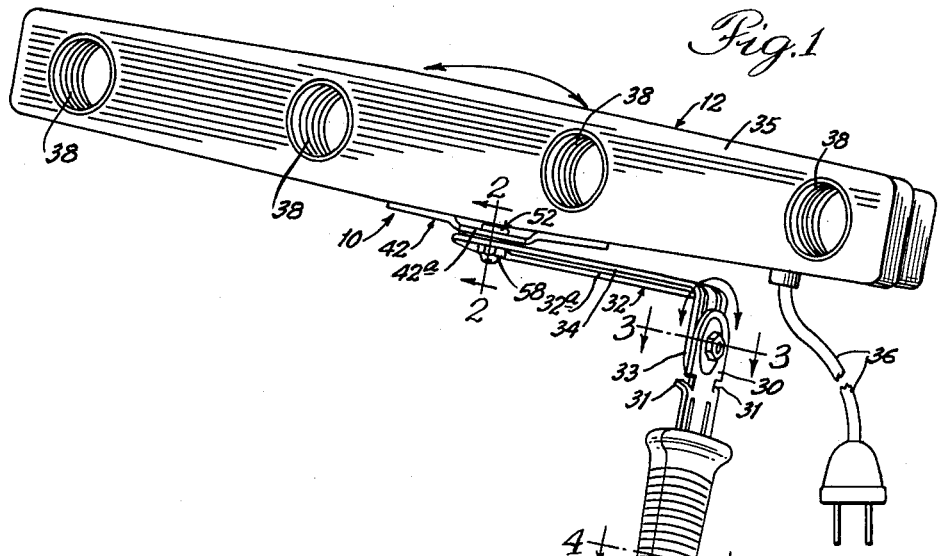
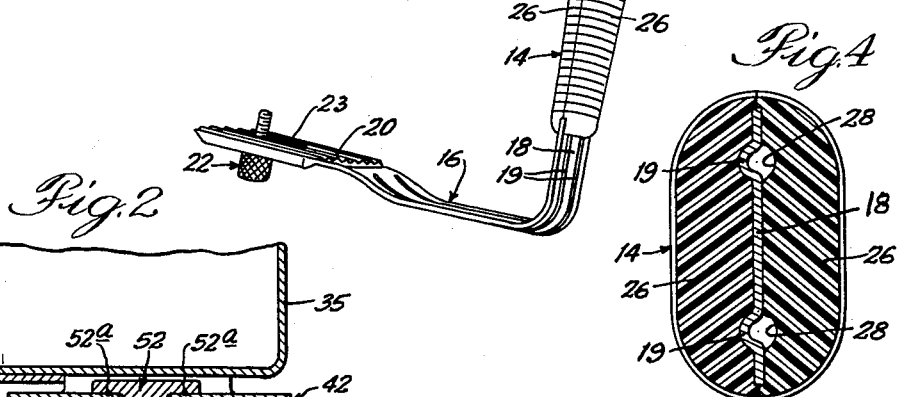
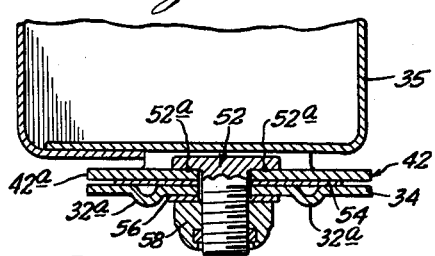
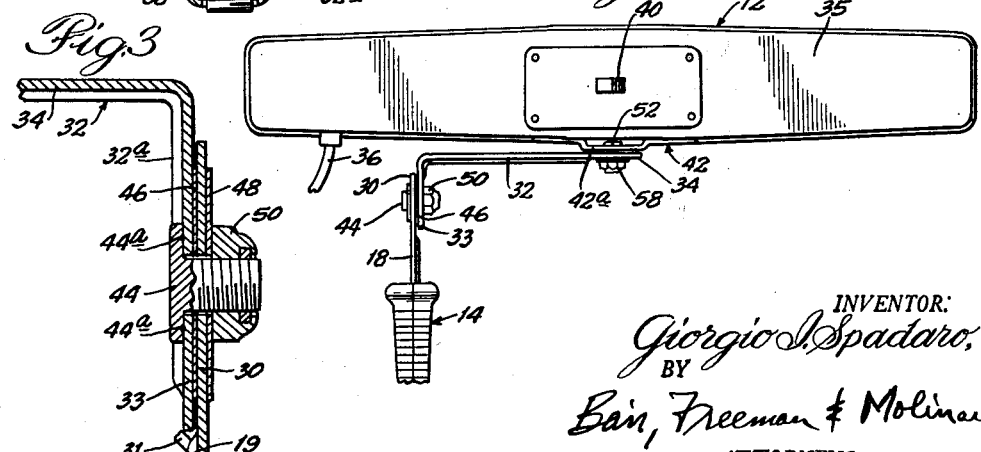
INVENTOR:
Giorgio I. Spadaro,
BY
Bair, Freeman & Molinare
ATTORNEYS.

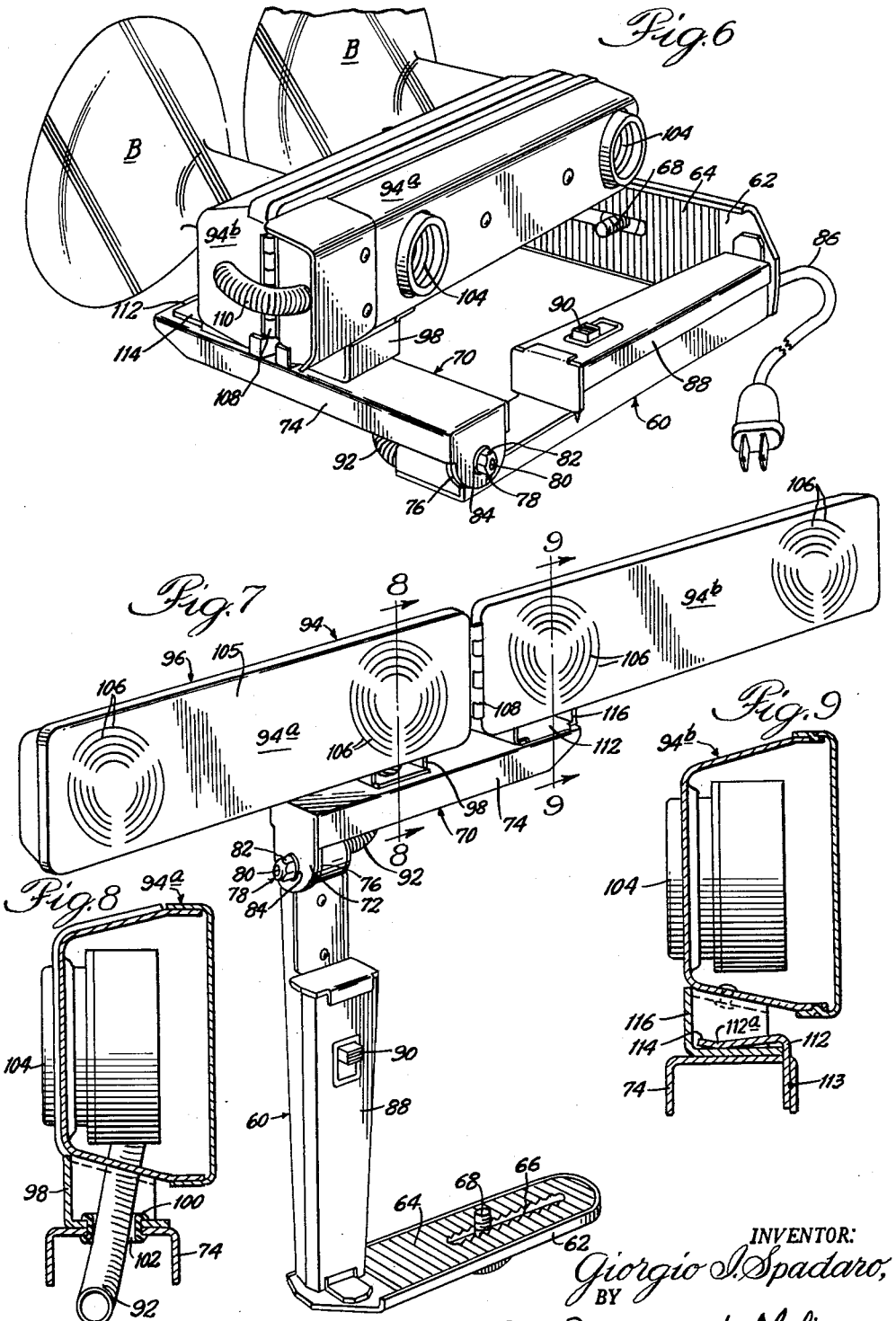

United States Patent Office 3,075,069
Patented Jan. 22, 1963

3,075,069
PHOTOGRAPHY APPLIANCE
Giorgio I. Spadaro, Northfield, Ill., assignor to Acme-Lite Manufacturing Co., Chicago, Ill., a corporation of Illinois
Filed Aug. 1, 1960, Ser. No. 46,789
8 Claims. (Cl. 240—1.3)

This invention relates to a photography appliance and more particularly relates to a light bar for use with motion picture cameras or the like.

A light bar is a well-known piece of photographic equipment that is frequently used in taking movies indoors. Heretofore, it has been standard practice to provide light bars having brackets or connectors thereon which permit of mounting the motion camera above the light bar to point in the same direction that the light bar points, so that the photographer, while holding the light bar with one hand, simultaneously holds the camera that is supported on the light bar and has his other hand free to manipulate the camera's controls.

One of the major deficiencies in such prior constructions lies in the fact that the light bar has a fixed attitude relative to the camera so that the light and camera always point in the same general direction toward the subject to be photographed. In taking pictures of children and infants it has been observed that the direct projection of the light onto the subject is so intense as to cause undesirable reactions in the subject such as turning away from the source of light, wincing, closing of eyes and the like. If the light could be directed at an angle relative to the photographic subject, many of the foregoing objections could be avoided. Furthermore, if light could be selectively directed so as to illuminate the photographic subject with light reflected from the ceiling, walls, or other reflective surfaces then the photographer is able to selectively vary his photographic approach to different subjects so as to produce more artistic movies that have therein desirable lighting effects as contrasted to the realistic pictorial result that is presently available.

Thus, one object of this invention is to provide a light bar in combination with a camera support bracket, wherein the light bar and bracket are articulated to permit of directing of the light from the bar in selected directions transverse to the direction in which the camera faces.

In the taking of home movies, probably the best indirect lighting of a subject that could be achieved from an illuminating light bar is by directing the light from the bar against the ceiling from whence it bounces onto the subject to illuminate the subject. With prior light bars where the camera is mounted above the bar, the directing of the light upwardly might interfere with the line of sight of the camera.

Thus, a further object of this invention is to provide a camera-supporting light bar type photography appliance wherein the light therefrom may be bounced from the ceiling onto the subject being photographed without interfering with the line of sight of the camera supported thereby.

In articulating a camera-supporting bracket to a light bar it is important that the parts not only be movable, as desired, to their selected positions but also that the parts will stay in their selected attitudes and not slip to new positions.

Thus, another object of this invention is to provide an articulated photography appliance having improved friction joints that permit of selective pivoting of the parts to selected positions and which operate to frictionally maintain the parts in their selected attitudes while inhibiting undesirable slipping between the parts.

And a further object of this invention is to provide a photography appliance comprising an articulated and foldable light bar and camera support bracket, which appliance is characterized by its inexpensiveness and simplicity of construction and by its ruggedness and efficiency of operation.

Some of the foregoing objects are achieved by a light bar and a camera support wherein the camera support is located below the light bar and the light bar is adapted to pivot about a horizontal axis so as to direct the light therefrom upwardly while the line of sight of the camera may be directed at various attitudes in a horizontal plane. In such a construction a single upright manual support for both the light bar and the camera support may be provided which serves as a connector between the light bar and the camera support.

For the purposes of convenience of location of controls it is here suggested and disclosed the desirability of locating a control for the light bar on the manual support, or handle, of the aforesaid appliance so that the light bar control will be desirably located adjacent the controls of the camera carried on the camera support and thereby providing for control of the light bar by the hand that holds the appliance.

Thus, still another object of this invention is to provide a handled combination light bar and camera support appliance wherein a control for the light bar is carried in the handle portion of the appliance.

It has further been observed that light bars are inherently elongated devices because they generally mount at least four photographic-type light bulbs to provide for sufficient illumination. This makes the light bar an awkward appliance to store.

Thus, as a further object of this invention, it is proposed to provide a light bar and camera support means that is adapted to be suspended below the light bar and which is so articulated that the entire appliance may be conveniently folded for storage in a relatively compact space.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of one form of photographic appliance embodying some of the inventions disclosed herein;

FIGURE 2 is an enlarged fragmentary cross-section of one of the friction joints and is taken on line 2—2 of FIGURE 1;

FIGURE 3 is similar to FIGURE 2 and is taken on line 3—3 of FIGURE 1;

FIGURE 4 is a cross-section view through the handle and is taken on line 4—4 of FIGURE 1;

FIGURE 5 is a fragmentary reduced rear elevation view of the light bar of FIGURE 1;

FIGURE 6 is a perspective view of a second form of photographic appliance embodying some of the inventions disclosed herein and showing the compact folding that may be achieved with this form of device;

FIGURE 7 is a rear perspective view of the device of FIGURE 6 in unfolded attitude;

FIGURE 8 is a cross-section view taken on line 8—8 of FIGURE 7 to show the pivot connection through which extends the electric cable from the handle to the light bar; and FIGURE 9 is a cross-section view taken on line 9—9 of FIGURE 7 to show the friction connection for maintaining the articulated light bar in its extended condition as seen in FIGURE 7.

Referring now to the drawings, there is shown in FIGURES 1 through 5 a first form of photographic appliance generally indicated at 10, which includes a light bar means 12 that is supported above an elongated upright handle means generally indicated at 14. The handle means 14 has a camera support arm 16 extending laterally from the lower end thereof.

With regard to the handle means and camera support arm, specifically there is provided an elongated sheet metal member 18 that is bent to define an upright portion that serves as part of the handle means 14, and a laterally extending portion that serves as the camera support arm 16. The sheet metal member 18 is rigidified by a pair of elongated, spaced, embossed ribs 19 extending longitudinally of the part 18. The extended end of the support arm 16 carries thereon a rubber pad 20, or the like, having a serrated upper surface adapted to receive thereagainst the underside of the camera that is to be supported on the camera support arm 16. A camera engaging and connecting means in the form of headed bolt 22 is carried on the support arm 16 adjacent the extended end of the arm and provides an elongated, threaded shank that extends through the arm 16 and pad 20 to extend thereabove, and an enlarged head located below the arm 16 for usual gripping manipulation. The bolt 22 is mounted for selective adjustment along a diagonal slot 23 to provide for a range of locations of the connecting means 22 relative to the support arm 16.

The remainder of the handle means 14 is formed by a pair of similar and complementary, plastic, handle parts 26 that are each provided with a pair of internal elongated recesses 28. In the assembly, as best seen in FIGURE 4, said recesses 28 cooperate to define elongated bores that are adapted to grippingly receive the embossed ribs 19 on the sheet metal member 18, with the handle parts 26 disposed on opposite sides of the upright portion of sheet metal member 18. The plastic handle parts 26 may be appropriately bonded together, such as by application of a solvent bonding material, to form an exteriorly serrated, unitary, handle.

A portion of the sheet metal member 18 extends above the plastic parts 26 and the uppermost portion of member 18 defines a flat pivot ear 30 to which is pivotally connected an angle-shaped light bar support bracket 32. The bracket 32 has an upright relatively short arm 33 and a laterally extending longer arm 34, and the said arms are reinforced by a pair of spaced, embossed, ribs 32a extending longitudinally of bracket 32. The arrangement provides for the light bar support bracket 32 to pivot about an axis that is transverse to the longitudinal axis of the handle means 14. The long arm 34 extends from handle 14 in the same general direction that the camera support arm 16 extends from handle 14. The sheet metal member 18 is also formed to define a pair of inwardly extending stops 31 which extend across the path of swing of the support bracket 32 and act to limit the available range of pivoting accorded to bracket 32.

The light bar means 12 includes an elongated, hollow, enclosing frame 35 having an electric service cord 36 extending therefrom and entering to the hollow interior of the frame 35 to connect to a control switch that controls energization of a plurality of light-bulb-receiving sockets carried by the frame. As shown in FIGURE 1, there are four such light-bulb-receiving sockets 38 carried on the forward side of the light bar means 12 and, as best seen in FIGURE 5, the rear side of the frame carries a switch controlling button 40 which is adapted to selectively control the energization of the bulb sockets 38. It will be understood that the service cord 36 leads to a switch (not shown) within frame 35 that is controlled by the button 40.

A second bracket 42 is shown secured to the underside of the frame 35, and the bracket 42 provides a pair of spaced legs which are spot-welded, or otherwise securely connected, to the frame 35, and having a central portion of the bracket 42a spaced from the frame 35. The said central portion 42a of bracket 42 is attached to the extended end of the bracket arm 34, whereby the frame 35 and bracket 32 are arranged for pivoting together about an axis that is transverse to the longitudinal axis of handle means 14. The specific connection of the second bracket 42 to the arm 34 of the first bracket 32 is a pivotal one that is located substantially above the camera-engaging and connecting means 22 and which is designed to permit light bar 12 to pivot about a second axis that is substantially parallel to the longitudinal axis of the handle means 14.

The pivot connections that are provided between the sheet metal member 18 and the first bracket 32, and between the first bracket 32 and the second bracket 42, are of the friction type that permit of controlled, selective forced pivoting, or angling, of the parts to a selected position and which then will retain the parts in the selected positions to which they have been pivoted. Such connections require that sufficient friction be developed to retain the parts in their selected attitudes, while at the same time providing that selected pivoting may be effected. The details of the specific pivot joints are shown in FIGURES 2 and 3.

The first pivot connection between the handle 14 and the bracket 32 is seen in FIGURE 3 and includes a headed bolt 44 whose head is spot-welded, such as at 44a, to the short arm 33 of the first bracket 32, with the head of the bolt located between the pair of spaced ribs 32a. A first fiber washer 46 is disposed between the pivoted parts, the arm 33 and the pivot ear 30; a second fiber washer engages the outer side of the pivot ear 30; and an anti-loosening nut, such as elastic stop nut 50, carrying a fiber insert 51, is threaded onto the extended end of the shank of pivot stud 44 and clamps the assembly together under a preselected pressure. The use of the nut 50 with fiber insert 51 inhibits inadvertent loosening of the connection and provides means for selecting the desired compression of the fiber washers and other parts so as to control the amount of friction imparted to the connection. Once the tension has been set, it is found that the parts may be pivoted to selected attitudes many times as desired, without the pivot working loose or requiring additional tightening up of the nut 50.

The second pivot connection between brackets 32 and 42 is best seen in FIGURE 2. There is provided a headed mounting bolt 52 which is spot-welded at 52a to the bracket portion 42a, so that the head of the bolt is located between the bracket 42 and the frame 35. A first fiber washer 54 is located between arm 34 and bracket 42; a second fiber washer 56 is located on the underside of arm 34 located between the spaced ribs 32a; and a nut 58, similar to nut 50, provides the pressure necessary for effecting the desired friction between the parts to provide an attitude-retaining pivotal connection.

The existence of the two pivot connections permits of selective directing of light from the light bar means 12 at angles relative to the direction in which a camera is faced when mounted on camera support arm 16.

In the form of device shown in FIGURES 6 to 9, there is provided, as generally indicated at 60, an upright, elongated, handle means, a portion of which is hollow, and which is adapted for gripping by one hand. Extending laterally from the lower end of handle means 60 is a camera support arm 62 that carries on its upper side a rubber pad 64, having a serrated upper surface against which a camera may be positioned. The arm 62 is longitudinally slotted at 66, and a camera-engaging-and-connecting means, in the form of bolt 68, extends upwardly through slot 66 to be selectively movable therealong. A bracket means 70, defining a downwardly extending short arm 72 and a long arm 74 of channel-shaped cross-section extends generally above the support arm 62. The bracket 70 is pivotally connected to a flange 76 at the upper end of the handle means 60, by means of a friction-providing pivot connection generally indicated at 78. The pivot connection 78 is of the same general nature as the pivot connections heretofore described and shown in FIGURES 2 and 3. The pivot connection includes a bolt 80 carried by arm 72, a stop nut 82, and a pair of appropriate fiber washers, the outer washer 84 being seen in FIGURES 6 and 7.

A service cord is shown at 86 and enters through the lower end of the upright handle means 60. The handle means 60 are partly hollow and include a casing 88 which houses therein a switch (not shown) that is interposed between the service cord 86 and a light bar at the upper end of the handle. A control button 90 extends outwardly of the casing 88 and is conveniently located to be manipulated by the thumb of the hand of the person that is grasping the handle means 60. Appropriate flexible electric conduit means are provided leading from the switch within casing 88 to the light bar, and a portion of the conduit means is shown at 92 leading from the handle means 60 to the elongated light bar means which is generally indicated at 94.

The light bar means 94 includes a hollow casing means 96. A first mounting flange 98 on bar 94 is secured to the bight of the long bracket arm 74 by means of a ferrule, or annular connector, 100 which provides a central aperture 102 through which the conduit 92 extends from the handle means 60 to the interior of the light bar means 94, as best seen in FIGURE 8.

The forward side of the light bar casing means 96 is provided with screw-type light-receiving sockets 104 that are appropriately connected to the electric energizing cable 92. The back side 105 of the casing means 96 is appropriately apertured, as indicated at 106, to provide for passage therethrough of cooling air.

In the preferred construction shown, the light bar means 94 is segmented to define a plurality of segments 94a and 94b that are joined together by a hinge 108 whose axis lies transverse to the length of bar means 94. An electric cable 110 electrically interconnects the segments 94a and 94b and conveniently telescopes into said segments when the bar is extended as seen in FIGURE 7, and is exposed when the bar is folded as seen in FIGURE 6. Cooperating means are provided between the bracket 70 and at least one segment of light bar 94 for releasably maintaining the light bar in unfolded condition. Specifically, the bracket arm 74 carries a spring clip 112 adjacent the extended end, which is spot-welded at 113 in position, and the spring clip 112 is extended forwardly and bent downwardly, as indicated at 112a, and then terminates with an upturned end 114. The segment 94b of the light bar means 94 carries a downwardly extending bracket 116 which is adapted to be releasably forced under the spring clip 112 to the position seen in FIGURE 9, wherein the segments 94a and 94b are maintained in their extended, unfolded, condition as seen in FIGURE 7.

It will be seen that the downwardly extending legs of the channel-shaped arm 74 cooperate with the handle means 60 to limit the range of pivoting of the light bar about the axis of the bolt 80 that lies transverse to the longitudinal axis of handle 60. Furthermore, the entire arrangement hereinabove described permits of the folding of the light bar to the compact arrangement seen in FIGURE 6, wherein the back sides of the light bar segments 94a and 94b are folded to lie adjacent each other and the folded bar 94 is pivoted on grommet 100 so that the segments 94a and 94b extend toward the camera support bracket 64 when the bracket 70 is pivoted to the position as seen in FIGURE 6. Such an arrangement provides a fairly compact device which is easy to store. The light bar may even carry the light bulbs B when being stored.

From the foregoing it will be seen that each form of device disclosed provides an articulated means which permits of selectively directing light from a photographic light bar in selected directions transverse to the direction in which the camera faces when supported on the camera support arm of the device. In particular, each form permits of bouncing light against the ceiling of a room to reflect upon the subject being photographed without interfering with the line of sight of the camera. In one of the described forms, means are desirably provided for pivoting the light bar selectively about each of two axes transverse to each other. In another of the described forms, means are desirably provided in the support handle of the appliance for selectively controlling the energization of the light means with the same hand that grasps the handle, thereby leaving a person's other hand free for operating the camera's controls.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A manually portable photographic appliance comprising, in combination, upright elongated handle means carrying a hand grip to enable gripping by one hand, a camera support arm connected to and extending laterally from the lower end of said handle means, camera engaging and connecting means carried on said support arm adjacent the extended end of said arm for carrying a camera in pivotably adjustable relation therewith, a bracket pivotally connected to the upper end of said handle means to pivot about an axis that is transverse to the longitudinal axis of said handle means, said bracket having a laterally extending arm which extends generally parallel and in the same direction that the camera support arm extends from the handle means, and light bar means comprising a housing having a plurality of sockets therein together with electrical connections therefor, said sockets each being adapted to support a light therein, means for pivotally connecting said housing to the extended end of said bracket arm for pivoting relative to said bracket arm about an axis substantially parallel to the longitudinal axis of said handle means, and the means connecting the housing of the light bar means to the bracket arm being located above said camera engaging and connecting means.

2. A manually portable photographic appliance comprising, in combination, upright elongated handle means carrying a hand grip to enable gripping by one hand, a camera support arm extending laterally from the lower end of said handle means, means for connecting said support arm to said handle means, a bracket pivotally connected to an upper portion of said handle means to pivot about an axis that is transverse to the longitudinal axis of said handle means, said bracket having a laterally extending arm which extends generally above the camera support arm and in a common plane therewith, a second bracket pivotably attached to the extended end of said bracket arm for pivoting about an axis transverse to the pivot axis of the first bracket, light bar means comprising a housing adapted to carry a plurality of lights together with electrical connections therefor, said housing being mounted on said second bracket and pivotable selectively with the second bracket relative to the first bracket and with the first bracket relative to said handle means, and each of said pivotable connections being a friction connection which permits of selective angling between the pvivoted parts and which then frictionally retains the parts in their selected positions.

3. A photographic appliance comprising, in combination, upright elongated handle means having a hand grip adapted for gripping by one hand, a camera support arm connected to and extending laterally from the lower end of said handle means, a bracket pivotally connected to an upper portion of said handle means to pivot about an axis that is transverse to the longitudinal axis of said handle means, said bracket having a laterally extending arm which extends generally above the camera support arm, light bar means connected to said bracket arm and being pivotable therewith so that the light therefrom may be pointed at selected angles relative to the direction in which a camera is faced when mounted on said camera support arm, said pivotable connection being a friction connection which permits of selective angling between the pivoted parts and which then frictionally retains the parts in their selected positions, the pivotable connection including a bolt whose shank serves as a threaded pivot stud for the respective parts, the head of the bolt being secured to a first of the pivoted parts to prevent relative pivoting therebetween, a first washer between the pivoted parts engaged by the adjacent sides of said parts, a second washer engaging the other side of the second pivoted part, and an elastic stop nut on the threaded pivot stud clamping the pivoted parts and washers together at a preselected pressure which affords selective pivoting of parts and subsequent frictional retention of parts in their selected positions, while the stop nut is inhibited from working loose.

4. A manually portable photographic appliance comprising, in combination, upright elongated handle means adapted for gripping by one hand, a camera support arm connected to and extending laterally from the lower end of said handle means, a bracket pivotally connected to an upper portion of said handle means to pivot about an axis that is transverse to the longitudinal axis of said handle means, said bracket having a laterally extending arm which extends generally above the camera support arm, light bar means connected to said bracket arm and being pivotable therewith, and said handle means including an elongated sheet metal member formed with a pair of elongated spaced embossed ribs, the sheet metal member being bent to define an upright portion and said laterally extending camera support arm, and a pair of similar plastic handle parts with elongated recesses adapted to grippingly receive the embossed ribs on the sheet metal member disposed on opposite sides of said upright portion with said handle parts bonded together to form a unitary hand grip.

5. A photographic appliance comprising, in combination, upright elongated handle means adapted for gripping by one hand, a camera support arm extending laterally from the lower end of said handle means, a bracket pivotally connected to an upper portion of said handle means to pivot about an axis that is transverse to the longitudinal axis of said handle means, elongated light bar means attached to said bracket arm, said elongated light bar means being segmented to fold about an axis transverse of the length of the light bar means, hinge means for connecting the segments of the light bar means, and cooperating means on said bracket and at least one segment of said segmented light bar for releasably maintaining the segmented light bar in unfolded condition.

6. A photographic appliance comprising, in combination, upright elongated handle means adapted for gripping by one hand, a camera support arm connected to and extending laterally from the lower end of said handle means, a bracket pivotally connected to an upper portion of said handle means to pivot about an axis that is transverse to the longitudinal axis of said handle means, elongated light bar means attached to said bracket arm, said elongated light bar means being segmented to fold about an axis transverse of the length of the light bar means, hinge means for connecting the segments of the light bar means, at least one segment of said light bar being pivotably mounted on said bracket to pivot about an axis transverse to the longitudinal axis of said bracket to permit of folding into a relatively compact relationship, switch means for controlling the light bar carried on said handel means, the said pivot connection between the light bar and the bracket being annular to define an aperture centrally thereof, and conduit means from the switch on the handle to said light bar extending through the aperture of said pivot connection.

7. A manually portable light weight photography appliance comprising, in combination, upright elongated handle means having a hand grip thereon adapted to be gripped by one hand, a camera support arm connected to and extending laterally from the lower end of said handle means, said arm comprising the sole support for a camera, a bracket pivotally connected to an upper portion of said handle means to pivot about an axis that is transverse to the upright longitudinal axis of said handle means, light bar means comprising a housing having socket means thereon adapted to receive a plurality of lights and electrical connections for said socket means, said housing being attached to said bracket arm to pivot therewith relative to said handle means, and switch means carried by said handle means and readily accessible from said hand grip for controlling the lights carried on said housing.

8. A manually portable light weight photography appliance comprising a light bar including a two part casing having a plurality of sockets therein adapted to carry a plurality of lights and electrical connections for each socket, means for pivotally connecting the two parts of said light bar casing, handle means for carrying said light bar casing, means for connecting said light bar casing to said handle means adjacent one end thereof for pivotable movement as a unit about each of two axes with respect to said handle means, means for pivotably carrying a camera on said handle means adjacent the other end thereof, said light bar being articulated to permit pivoting one part of said light bar casing with respect to the other part of said light bar casing, and cooperating means on said light bar casing and on said bracket for releasably maintaining the two-part light bar casing in unfolded condition.

References Cited in the file of this patent

UNITED STATES PATENTS

| | | |
|---|---|---|
| 1,159,047 | Kimura | Nov. 2, 1915 |
| 2,535,372 | Schaeffer et al. | Dec. 26, 1950 |
| 2,599,269 | Markle | June 3, 1952 |
| 2,661,671 | Jacobson et al. | Dec. 8, 1953 |
| 2,719,469 | Sanford | Oct. 4, 1955 |
| 2,949,838 | Skalabrin | Aug. 23, 1960 |

FOREIGN PATENTS

| | | |
|---|---|---|
| 116,662 | Australia | Mar. 2, 1943 |
| 66,768 | Denmark | Apr. 26, 1948 |